United States Patent [19]

Fredkin

[11] Patent Number: 4,645,599
[45] Date of Patent: Feb. 24, 1987

[54] FILTRATION APPARATUS

[76] Inventor: Edward Fredkin, 166 Hyslop Rd., Brookline, Mass. 02146

[21] Appl. No.: 800,029

[22] Filed: Nov. 20, 1985

[51] Int. Cl.$^4$ ............................................. B01D 13/00
[52] U.S. Cl. ................................ 210/416.1; 210/433.2
[58] Field of Search ................ 210/321.1, 416.1, 433.2

[56] References Cited

U.S. PATENT DOCUMENTS 4,410,429  10/1983  Harvey et al. .................. 210/416.1

Primary Examiner—Frank Spear
Attorney, Agent, or Firm—Pahl, Lorusso & Lord

[57] ABSTRACT

In the reverse osmosis pumping system disclosed herein, a pair of work exchange vessels are located at two different heights. By means of a dense working fluid coupling one side of each of the vessels, an increased static head is maintained on one side of the apparatus relative to the static head corresponding to the fluid to be filtered which occupies the other side. The pumping system is operated alternately in low and high pressure phases. During the low pressure phase, the mean height of the dense work fluid is raised and the resultant stored energy is utilized to induce flow through a reverse osmosis membrane unit during the high pressure phase of operation. As it is important that a constant pressure and flow be maintained at the membrane chamber, multiple pumping systems are preferably provided, operating in phase alternation, so that the filter itself may be operated under relatively constant pressure.

3 Claims, 3 Drawing Figures

FILTRATION APPARATUS

BACKGROUND OF THE INVENTION

The present invention relates to reverse-osmosis apparatus and more particularly to an energy conservation pumping system for use in the desalinization of sea water by reverse osmosis ultrafiltration.

It has previously been recognized that the desalinization of sea water by reverse osmosis or ultrafiltation involves considerable wastage of energy if the concentrated by-product (brine) is discharged at the high pressure required for reverse osmosis without employing some means to recover the energy latent in that flow. Energy recovery schemes are described for example in the U.S. Pat. No. 4,354,939 issued on Oct. 19, 1982 to Kurt M. Pohl and in the article entitled "Energy Recovery For Small Reverse-Osmosis Systems" by Jeffrey C. Eid and Melvin E. Mattson.

While the systems described in these prior publications may provide for the recovery of otherwise lost energy, they have not proven cost effective in actual practice for a variety of reasons. Principal among the difficulties encountered in these prior art systems is the need to provide pumps which will pump sea water at high pressure or which will pump sea water at a high ambient pressure though required only to provide only a small differential pressure. As will be understood by those skilled in the art, these requirements are not easily met by readily available standard components.

Among the several objects of the present invention may be noted the provision of novel apparatus for desalinizing sea water; the provision of desalinization apparatus which does not require the conventional pumping of sea water at high pressure; the provision of pressure reverse osmosis apparatus which is energy efficient; the provision of reverse osmosis apparatus which does not require the operation at high ambient pressure of pumps providing relatively small pressure differentials; the provision of such apparatus which is highly reliable and cost effective and which is of relatively simple and inexpensive construction. Other objects and features will be in part apparent and in part pointed out hereinafter.

SUMMARY OF THE INVENTION

Briefly stated, the reverse osmosis pumping system according to the present invention employs first and second work exchange vessels each of which is divided into at least two chambers by a compliant barrier. One of the vessels is located substantially above the other. A conduit linking one chamber of each vessel to the other is filled with a working fluid which is substantially denser than the fluid to be filtered. The filter inlet and by-product outlet are connected to other chambers of the work exchange vessels. During a first, low pressure phase of operation, source fluid is pumped into one of the vessels thereby raising the mean height of the working fluid and driving by-product fluid out of the other vessel. Pump means are provided for pressurizing the filter side of the vessels during a second, high pressure phase of operation and for making up fluid volume lost by filtrate passing through the membrane. During this high pressure phase, a flow from the reverse osmosis membrane unit inlet to the by-product outlet is driven by the increased static head pressure developed by the greater density of the working fluid relative to the static head corresponding to the source fluid.

BRIEF DESCRIPTION OF THE DRAWINGS

Corresponding reference characters indicate corresponding parts throughout the several views of the drawings.

DESCRIPTION OF THE PREFERRED EMBODIMENT

Figure 1:
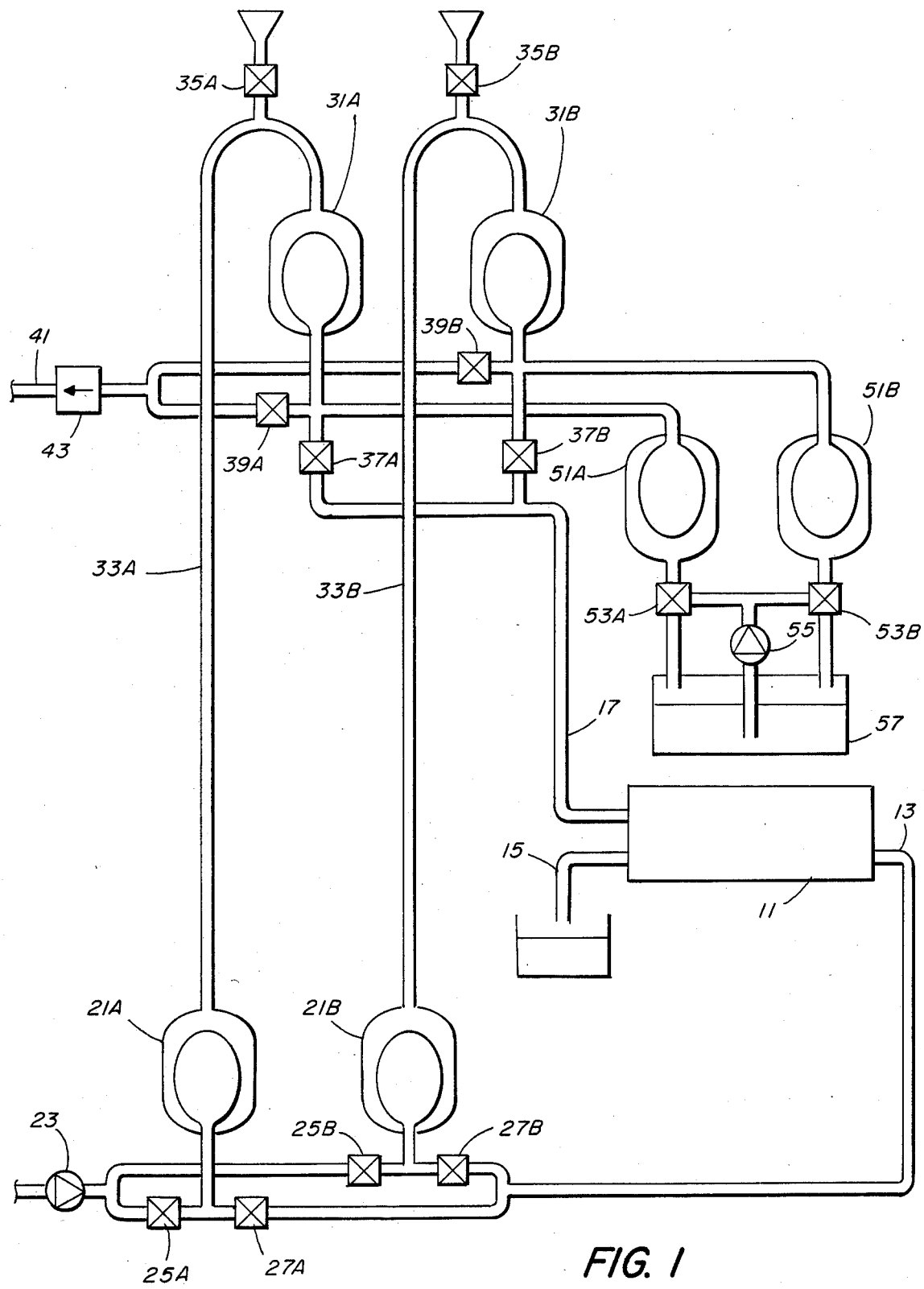
FIG. 1 is a fluid diagram of reverse osmosis desalinization apparatus constructed in accordance with the present invention.

Referring now to FIG. 1, a reverse-osmosis unit or ultrafilter is designated generally by reference character 11. Such units are essentially conventional and commercially available and are thus are not described in detail herein. It is, however, useful to note that such units typically operate at relatively high pressures, i.e. on the order of 800 pounds per square inch. When brine is applied at such pressure, i.e. to an inlet port 13, the flow will essentially be separated into two streams, a filtrate stream which is of relatively small volume but which is of greatly reduced salt content and a by-product stream, i.e. brine, which is of increased salt content. As is understood, the filtrate is discharged at low pressure while the brine is discharged at relatively high pressure subject only to a relatively small, friction pressure drop as the larger volume fluid flow passes by the reverse osmosis membrane.

As indicated previously, the individual pumping portions of the reverse osmosis system operates in alternating low and high pressure phases. Preferably, as illustrated, the overall system may employ two or more essentially similar pumping systems which operate with their low and high pressure phases cycled alternately so that the reverse osmosis unit is pressurized essentially constantly and is provided with a flow of the source fluid (seawater) by one or the other of the pumping systems essentially continuously. In FIG. 1, the corresponding element of the two pumping systems have been given the same reference character with the suffix "A" for left hand pumping system and the suffix "B" for the right hand pumping system.

As also indicated previously, it is one of the objects of the present invention to satisfy the requirement for constant high-pressure salt water at the reverse osmosis membrane unit without pumping by conventional means for proper operation of the reverse osmosis unit 11. Another objective is to conserve pumping energy whenever possible. In achieving these objectives, the present invention utilizes a number of flow work exchange devices. In the embodiment illustrated, these flow work exchange devices are implemented by means of structures which are essentially equivalent to bladder-type accumulators.

With reference to FIG. 1, each of the two pumping systems employs a first work exchange device 21 in which the one chamber, i.e. the bladder, can be alternately filled with sea water from a pump 23 through a valve 25 or can empty into the inlet port 13 of the reverse osmosis device 11 through a valve 27. As is understood by those skilled in the art, some pretreatment and pre-filtering of the seawater, e.g. to control pH, may be necessary before reverse osmosis. While check valves might be used for the valves 25 and 27, as well as at other points in the system, it is presently preferred to use electric or air operated valves which can be opened completely and rapidly so as to produce very little flow resistance.

Each pumping section also includes a second work exchange device 31 which is mounted at a point which is substantially higher than the work exchange device 21. One set of chambers of each of the work exchange devices in either side are connected to each other through a relatively open conduit 33. In this example, the outer chambers and the conduit connecting them are filled with a working fluid, which is substantially denser than the sea water source fluid, e.g. mercury. A valve and filling inlet is provided as indicated by reference character 35 for filling these spaces and purging any bubbles which might occur.

Brine exiting from the by-product (brine) outlet 17 of the reverse osmosis device unit 11 can be admitted to the inner chamber (bladder) of each of the work exchange units 31 through a respective valve 37. During alternate phases of operation, the bladder can empty, through a valve 39, into the brine waste outlet designated generally by reference character 41. Since, under the same circumstances, it is desirable that some back pressure be provided for purposes described hereinafter, this outlet may also include a spring biased valve 43.

In addition to the two valved connections, the inner chamber (bladder) of each work exchange unit 31 connects directly to the inner chamber of a third work exchange unit 51. As is explained in greater detail hereinafter, the work exchangers 51 are utilized in pressurizing the respective pumping systems during the high pressure phase of operation of each and in making up or replacing fluid which is lost as the filtrate is extracted from the sea water flow by the reverse osmosis process. For pressurizing the vessels 51, the outer chamber of each is connected, through a three-way valve 53, to a (high pressure hydraulic pump 55) which can draw hydraulic fluid from a reservoir 57. The three-way valves 53 allow the outer chamber of each vessel 51 to be vented back to the reservoir 57 when it is desired to release the pressure in the corresponding system and to allow the inner chamber of the vessel 51 to expand and be filled with brine during the low pressure phase of operation.

Taking the left hand pumping system by way of example, the sequence of operations is essentially as follows. With the valves 27A and 39A open and with the valves 27A and 37A closed, pump 23 is operated to introduce sea water into the inner chamber (bladder) of the work exchange device 21A. At the same time, the valve 53A is set so that hydraulic fluid can be returned to the reservoir 57 from the outer chamber of the device 51A. In filling the bladder, the pump 23 must develop sufficient pressure to overcome the static head corresponding to the column of the dense working fluid which spans the height between the work exchange devices 21A and 31A. Thus, in filling the bladder of the device 21A, the pump 23 stores energy by raising the mean height of the working fluid. At the same time, brine is expelled from the inner chamber (bladder) of the work exchange device 31A. Due to the back pressure provided by the valve 43, a portion of this flow fills the inner chamber (bladder) of the work exchange device 51A while the remainder is ejected through the (brine discharge port 41).

The proportion of the flow which needs to return to the bladder of the device 51A is essentially equal to the proportion of filtrate which is obtained from a given flow of source fluid into the reverse osmosis membrane unit. This volume is later used, as described hereinafter, to make up the loss of that volume by reverse osmosis during the high pressure phase of operation.

Once the bladder of the device 21A is sufficiently filled, the valves 25A and 39A are closed, the valves 27A and 37A are opened, and the three-way valve 53A is set so that the pump 55 can pressurize the vessel 51A. Since there is direct fluid communication amongst the three work exchange devices 21A, 31A, 51A, it can be seen that a high hydraulic pressure developed by the pump 55 will be exerted throughout the entire pumping system. Once the pumping system reaches the pressure at which it is desired to operate the reverse osmosis unit 11, the valves 37A and 27A are opened thereby putting the reverse osmosis unit 11 into a fluid path between the inner chambers of the work exchange units 21A and 31A.

While the outer chambers of the devices 21A and 31A are connected to each other through the conduit 33A and the inner chambers are connected to each other through the reverse osmosis device 11, the static pressure head in these two paths is not equal since the conduit 33A is filled with the denser working fluid. This pressure differential is available to overcome a dynamic fluid flow pressure drop between the inlet 13 and outlet 17 of the reverse osmosis unit 11. Thus, there will be a flow of sea water from the inner chamber of device 21, through the reverse osmosis unit 11 into the inner chamber of the device 31A, the energy required being provided by the energy previously stored in raising the mean level of the working fluid.

Due to the extraction of product water by the unit 11, there will however, be a discrepancy in the flow rate between the inlet 13 and the outlet 17. This discrepancy is made up by brine driven out of the inner chamber of device 51A, displaced by hydraulic fluid introduced into the inner chamber of the device by the pump 55. In essence, the energy provided by the pump 55 replaces that inherently lost in the reverse osmosis unit by the ejection of the filtrate through outlet 15, the flow rates and pressure differentials being essentially equal as will be apparent to those skilled in the art.

While the description thus far has been of the operation of the first pumping system, it will be readily understood that the operation of the second, or additional pumping systems are essentially the same as that of the first system except that one side takes in sea water and discharges brine at low pressure while the other side takes in high pressure brine and passes high pressure sea water to the filter unit and vice versa and their operating cycles are the same as individual cylinders would be in a combustion engine. The object of all this being the maintenance of constant pressure at the membrane unit with the least use of energy in the process. Preferably, for a dual system, as oppose to a triple system, the pump 23 is operated at a rate such that filling with sea water can be accomplished in slightly less time than the discharge cycle so that the next side in sequence can be filled and pressurized before the current side has completed its high pressure and discharge cycle. Thus the reverse osmosis unit 11 can be maintained essentially continuously under pressure and thus essentially in continuous filtering operation. Alternately, three or more similar pumping systems can be used operating in interleaved phases so as to maintain a constant pressurization of the filter.

Since flow through the reverse osmosis device from the inlet 13 to the outlet 17 is driven by stored energy, during the high pressure phase of operation, it can be seen that there is no need for a pump to operate at high static pressure in a use which requires developing only a small pressure drop. Further, since the loss of volume through the extraction of filtrate is made up by means of the devices 51 which are driven by the pump 55, it can be seen that it is not necessary to conventionally pump sea water at extremely high pressure at any point in the system. Rather, the high pressure pump can be of conventional design for operation with normal hydraulic fluid. Accordingly, it can be seen that the use of the concepts of the present invention facilitates the creation of a very efficient and reliable desalinization apparatus utilizing essentially standard components which are readily available at modest cost.

Figure 2:
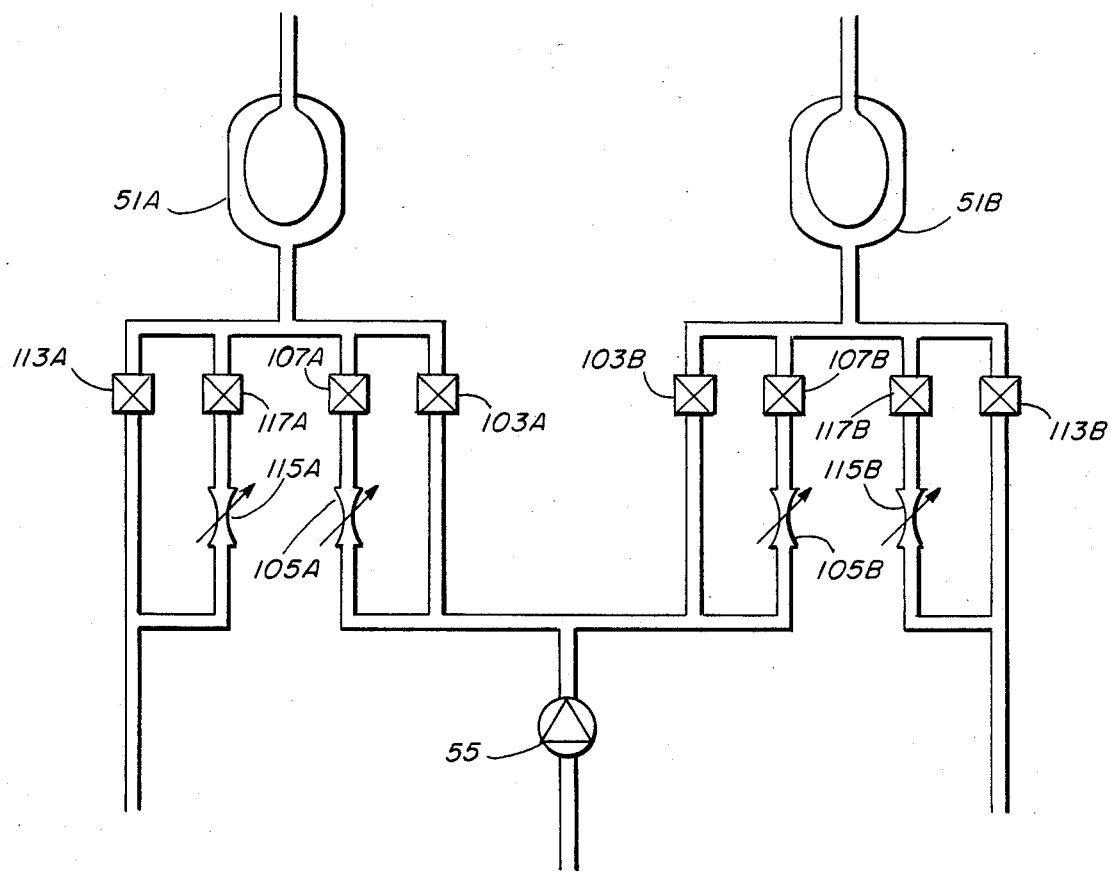
FIG. 2 is a fluid diagram of an alternative form of valving useful in the system of FIG. 1.

While the apparatus of FIG. 1 has been described as employing simple three way valves 53A and 53B for controlling the alternating high and low pressure phases in order to simplify the description of operation, it is preferable that a two stage valving be used in actual practice in order to effect a gradual application of high pressure. Such valving is illustrated in FIG. 2.

As may be seen, each work exchange vessel 51A and 51B is connected to a high pressure supply line 101 through a conduit which includes a high capacity valve, 103A and 103B respectively, and also through a conduit which includes a flow restrictor, 105A and 105B respectively, as well as a small capacity control type valve, 107A and 107B respectively.

Similarly, each work exchange vessel 51A and 51B is connected to a low pressure return line 111 through a conduit which includes a high capacity valve, 113A and 113B respectively, and also through a conduit which includes a flow restrictor, 115A and 115B respectively, as well as a small capacity or control type valve, 117A and 117B respectively.

When it is desired to pressurize one of the work exchange vessels 51A or 51B, the respective control type valve 107A or 107B is opened slightly in advance of the respective large capacity valve. Accordingly, the flow limiting provided by the respective restrictor 105A or 105B will cause the pressure to build up gradually in that portion of the pumping system which is about to be brought into fluid communication with the filter itself. The respective high capacity valves, 113A or 113B, and the valves connecting the pumping system to the filter are then opened only after essentially full operating pressure is reached.

Similarly, when each pumping system has completed the portion of the cycle when it is connected to the filter, the valves in the respective restricted conduit, i.e. 117A or 117B, is opened after the valves to the filter are closed but before the high capacity valve 113A or 113B is opened, thereby to allow pressure to gradually reduce in the respective pumping system.

Figure 3:
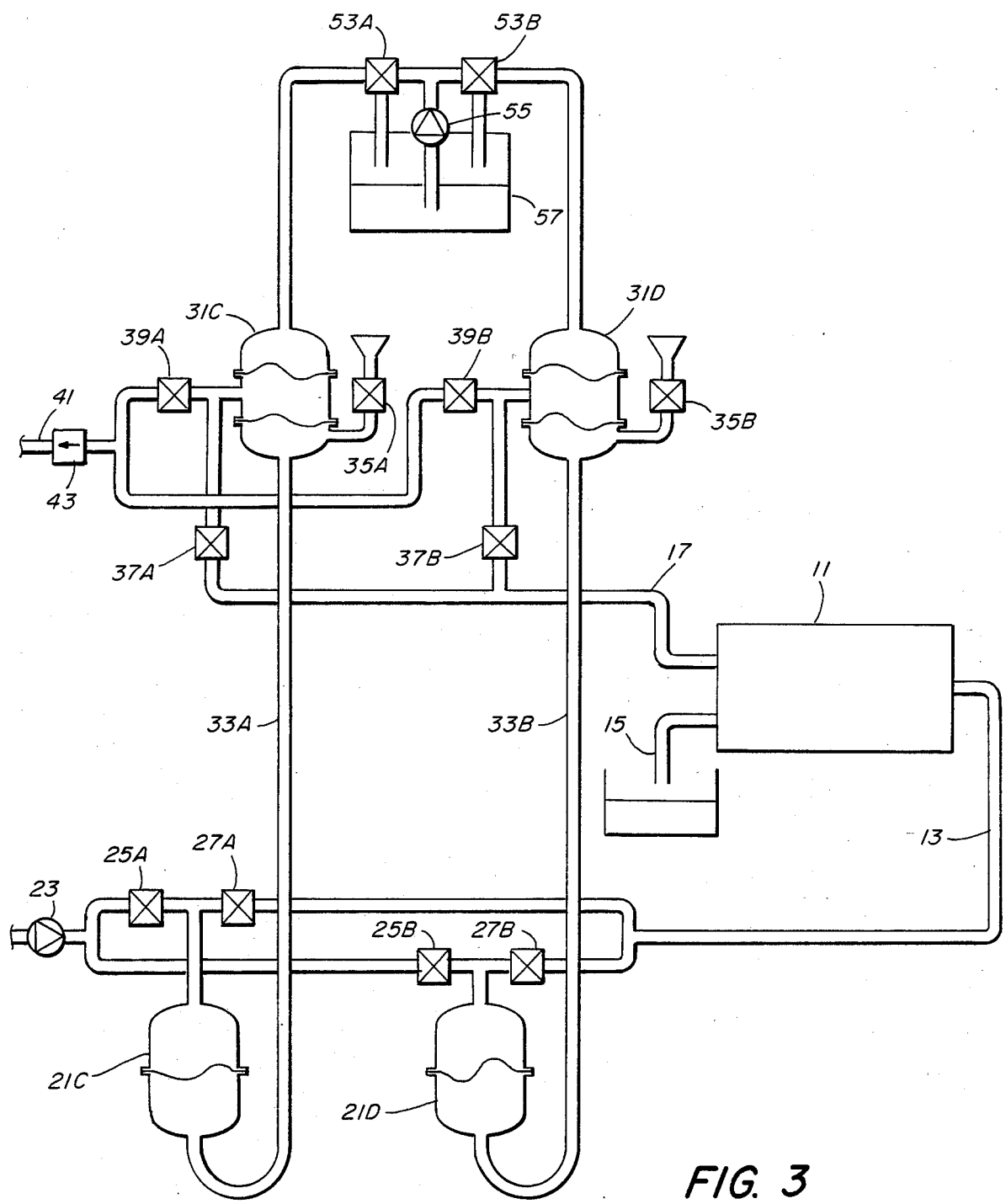
FIG. 3 is a fluid diagram of an alternative embodiment of the pumping system employed in the system of FIG. 1.

While bladder type flow work exchange device have been illustrated in FIG. 1 because such structures are readily available and cost effective, it should be understood that other types might also be used, e.g. diaphragm or piston types. Likewise, many variations are possible as to which side of a given device is filled with working fluid or seawater/brine etc. In addition, it may be advantageous in some circumstances to utilize flow work exchange devices having more than two chambers. FIG. 3 illustrates one such alternative.

In the FIG. 3 embodiment, the lower work exchange devices 21C and 21D are two chamber limp diaphragm devices while the upper work exchange devices 31C and 31D are three chamber devices, there being a pair of diaphragms to separate adjacent pairs of chambers. Each of these upper work exchange devices combines the functions of a pair of work exchange devices, e.g. 31A and 51A of the embodiment of FIG. 1. It can be seen that the systems are essentially equivalent in a topological sense, however, since in the systems of FIG. 1 the inner chambers of the devices 31A and 51A are always connected to one another and are thus essentially equivalent to the single middle chamber of the device 31C of FIG. 3. Other variations will be apparent to those skilled in the art.

In view of the foregoing, it may be seen that several objects of the present invention are achieved and other advantageous results have been attained.

As various changes could be made in the above constructions without departing from the scope of the invention, it should be understood that all matter contained in the above description or shown in the accompanying drawings shall be interpreted as illustrative and not in a limiting sense.

What is claimed is:

1. Apparatus for reverse osmosis treatment of a source fluid, said apparatus comprising:

first and second work exchange vessels each of which is divided into at least two chambers by a compliant barrier which prevents fluid mixing between the chambers, one of said vessels being located substantially above the other;

first fluid conduit means linking one of the chambers of said first vessel to one of the chambers of said second vessel;

filling said first fluid conduit means, a working fluid which is substantially denser than said source fluid and thereby provides an increased static head pressure between said vessels relative to the static head pressure corresponding to said source fluid;

reverse osmosis means having a source fluid inlet, a byproduct outlet, and a filtrate outlet;

second fluid conduit means connecting another chamber of one of said vessels to the inlet of said reverse osmosis means and another chamber of the other of said vessels to the byproduct outlet of said filter;

means operative during a first, low pressure phase for pumping source fluid into said another chamber of said one of said vessels thereby raising the mean height of said working fluid and driving byproduct fluid out of the said another chamber of said other vessel; and pump means operative during a second phase for pressurizing said second conduit means and making up fluid volume lost by filtrate passing through said reverse osmosis means, flow from the filter inlet to the byproduct outlet being driven by the increased static head pressure developed by the greater density of said working fluid.

2. Apparatus for reverse osmosis treatment of a source fluid, said apparatus comprising:

a first work exchange vessel, which is divided into at least two chambers by a compliant barrier which prevents fluid mixing between the chambers;

located substantially above said first work exchange vessel, a second work exchange system which is divided into three chambers by compliant barriers which prevent fluid mixing between the chambers;

first fluid conduit means linking one of the chambers of said first vessel to one of the chambers of said second vessel;

filling said first fluid conduit means, a working fluid which is substantially denser than said source fluid and thereby provides an increased static head pressure between said vessels relative to the static head pressure corresponding to said source fluid;

reverse osmosis membrane unit means having a source fluid inlet, a byproduct outlet, and a filtrate outlet;

second fluid conduit means connecting another chamber of one of said vessels to the inlet of said reverse osmosis membrane unit and another chamber of the other of said vessels to the byproduct outlet of said reverse osmosis membrane unit;

means operative during a first, low pressure phase for pumping source fluid into said another chamber of said one of said vessels thereby raising the mean height of said working fluid and driving byproduct fluid out of the said another chamber of said other vessel; and pump means operative during a second phase for providing a hydraulic fluid at high pressure to the remaining chamber of said second work exchange system thereby to pressurize said second conduit means and to make up fluid volume lost by filtrate passing through said reverse osmosis membrane unit, flow from the reverse osmosis unit inlet to the by product outlet being driven by the increased static head pressure developed by the greater density of said working fluid.

3. Apparatus for reverse osmosis processing of a source fluid, said apparatus comprising:

first and second work exchange vessels each of which is divided into at least two chambers by a compliant barrier which prevents fluid mixing between the chambers, one of said vessels being located substantially above the other;

first fluid conduit means linking one of the chambers of said first vessel to one of the chambers of said second vessel;

filling said first fluid conduit means, a working fluid which is substantially denser than said source fluid and thereby provides an increased static head pressure between said vessels relative to the static head pressure corresponding to said source fluid;

reverse osmosis membrane unit means having a source fluid inlet, and an outlet;

second fluid conduit means connecting another chamber of one of said vessels to said inlet and another chamber of the other of said vessels to said outlet;

means operative during a first, low pressure phase for pumping source fluid into said another chamber of said one of said vessels thereby raising the mean height of said working fluid; and pump means operative during a second phase for pressurizing said second conduit means flow from the reverse osmosis membrane unit inlet to the outlet being driven by the increased static head pressure developed by the greater density of said working fluid.

* * * * *